UNITED STATES PATENT OFFICE.

ROBERT NEWELL, OF PHILADELPHIA, PENNSYLVANIA, ASSIGNOR TO R. NEWELL & SON, OF SAME PLACE.

IMPROVEMENT IN COMPOUNDS FOR COATING WOOD AND OTHER ARTICLES TO RENDER THEM ACID-PROOF.

Specification forming part of Letters Patent No. 140,530, dated July 1, 1873; application filed June 21, 1873.

*To all whom it may concern:*

Be it known that I, ROBERT NEWELL, of the city and county of Philadelphia and State of Pennsylvania, have invented a new and useful Composition for Rendering Articles Acid-Proof; and I do hereby declare the following to be a clear and exact description of the nature thereof, sufficient to enable others skilled in the art to which my invention appertains to fully understand, make, and use the same.

This invention consists in a composition of matter applicable for rendering various articles proof against the injurious effects of acid necessarily brought in contact therewith.

In carrying out the invention I proceed as follows: One pound of paraffine and two pounds of wax are placed in a suitable pan, kettle, pot, or other vessel and heated until melted or fused. This I denominate as preparation number one. Four ounces of resin, two of Burgundy pitch, and two ounces of asphaltum are likewise placed in a suitable vessel and heated until melted or fused. This I denominate as preparation number two.

Preparations numbers one and two, both in a heated state, are applied to each other and well incorporated, after which the article to be protected is ready to be coated with the compound which, being properly heated or warmed, may be applied to the article by a brush, or in any other suitable manner.

It will be seen that wood, earthenware, metal, or any other article liable to be injured by acid may be protected against such injury by surfacing such article with the composition as stated, and the same will also be found to be elastic, and not liable to crack and permit access of the acid to the article.

Having thus described my invention, what I claim as new, and desire to secure by Letters Patent, is—

The herein-described composition for the purpose described, when compounded of the ingredients in the manner and about the proportions as set forth.

R. NEWELL.

Witnesses:
WM. P. HIBBARD,
HENRY NEWELL.